United States Patent Office 3,291,120
Patented Dec. 13, 1966

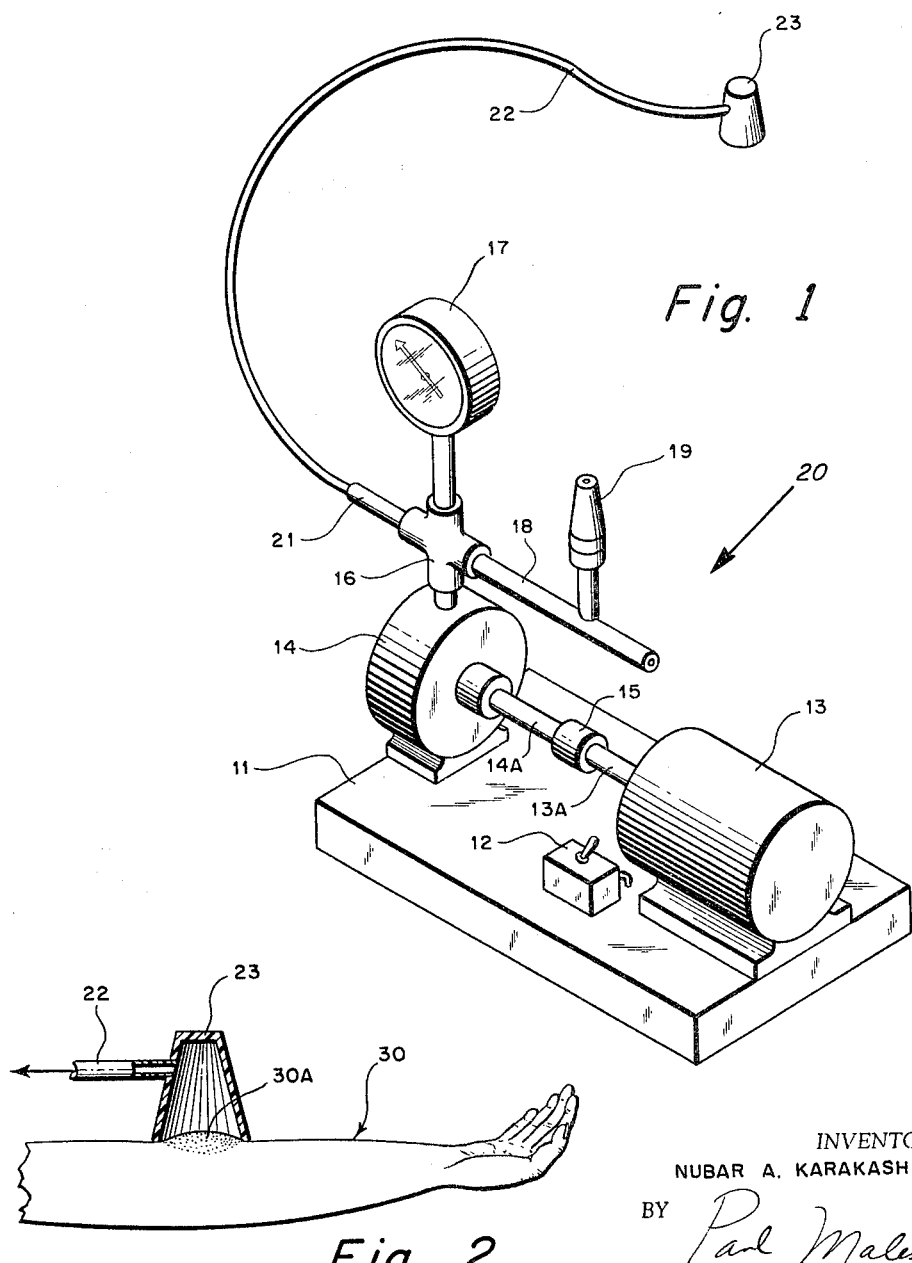

3,291,120
CAPILLARY FRAGILITY TESTING APPARATUS
Nubar A. Karakashian, 539 E. Allegheny Ave.,
Philadelphia, Pa.
Filed July 19, 1963, Ser. No. 296,318
2 Claims. (Cl. 128—2)

This invention relates to apparatus used in determining capillary fragility.

More particularly, this invention relates to apparatus by which an operator can quickly and accurately test a subject and arrive at an index of the strength of the subject's capillary walls.

It has been known that capillary fragility is a diagnostic aid of some importance. Increased fragility is associated with high intracapillary pressure and low capillary strength and integrity. These conditions are associated with various diseased states, and there is also an apparent hereditary tendency to good or poor capillary beds, as is described more fully below in this patent.

In certain surgery, certain patients may bleed to a dangerous degree. It has been found that a high index of capillary fragility tends to indicate a propensity to dangerous bleeding. When the method and apparatus of this invention are used to determine that such a condition exists, certain treatments are available to help reduce the risk of excessive bleeding during surgery. For example, it has been found by others that treatment with hesperidin or hesperidin methyl chalcone reduces excessive fragility. It is understood that this invention relates only to the method and apparatus for determining an index of fragility, and not to any treatment based on that index.

It has been suggested by Gothlin and others to determine a Petechial Index by using a standard blood pressure cuff around both upper arms of a patient, and by keeping the cuffs under set pressures for fifteen minutes. The pressure is then reduced. Petechiae in specified areas on each arm are then measured. The process is repeated under higher cuff pressures on each arm at least one hour later. The cuff pressure used is not standardized: it varies for different individuals depending on blood pressure. The method is relatively lengthy and inaccurate.

The present apparatus provides a much faster test and one of much more accuracy and reproducibility.

It is an object of this invention to provide an apparatus for testing capillary fragility.

Other objects of this invention are to provide apparatus of a highly standardized nature to arrive at a reliable capillary fragility index by applying a vacuum to the skin.

Other aims and objects of this invention are made apparent in the following specification and claims, in which like reference numerals refer to like parts and in which:

FIGURE 1 is a perspective view of the vacuum apparatus, and

FIGURE 2 is a side view, partially fragmented and partially cross-section, of the cup being applied to a patient.

The invention is best initially understood by describing the apparatus which is generally designated 20. A base 11 is provided. On this base are mounted an electric motor 13 and a vacuum pump 14. The motor 13 is operatively connected to the vacuum pump 14 by means of a motor shaft 13A which is connected to the pump shaft 14A. A flexible coupling 15 is provided between shafts 13A and 14A to connect them. An on-off switch 12 controls the operation of the motor.

The suction end of the vacuum pump 14 is connected to a T 16. One branch of this T is connected to a vacuum gauge 17. Another branch of the T is a bleeder line 18 which is equipped with a bleeder valve 19. The bleeder valve 19 is an adjustable pin-type valve which may be accurately adjusted to vary the opening from the vacuum pump through the bleeder line to atmosphere, and it is apparent that the wider this valve is opened, the more air may be taken in through bleeder line 18 and thus the lower is the vacuum created.

The final branch of the T is the operating or vacuum line 21, which is connected to a flexible tube 22. Tube 22 terminates in a cup 23. As best shown in FIGURE 2, tube 22 opens into a wall of cup 23.

The motor may be a 1/50 H.P. 110 v. A.C. motor, and the vacuum pump may be an ordinary rotating type pump. The vacuum gauge 17 is normally calibrated to read in centimeters of mercury vacuum. The flexible tube 22 and the cup 23 are preferably made of plastic, which may be clear plastic. The cup is rigid, and its walls may be tapered as shown in FIGURE 2 or may be parallel. When the opening of the cup 23 is placed against a surface, such as the skin of a patient, it is apparent that the apparatus will draw a vacuum which will be indicated on the gauge. This vacuum may be set at a determined value by opening or closing bleeder valve 19, and it has been found that accurate vacuum levels may easily be set and steadily maintained by this adjustment. It is also apparent that the vacuum is constantly applied while the motor is operating.

The quantitative values have been standardized as part of the present invention. The vacuums involved vary between 10 and 30 centimeters, and therefore the pump 14 and gauge 17 are of such capacity and range as to fit these requirements. The area of the open end of cup 23 is such that it is the area of a circle of 20 millimeters diameter.

The method of use is now described: An area on any hairless part of the body, usually on the inside of the upper arm is chosen and any obvious petechiae (ruptured small blood vessel or capillary) are avoided or taken into account by examination with a 2½×loupe or magnifying lens. The open face of cup 23 is placed on the chosen area, and a vacuum of 30 centimeters of mercury is applied for a period of one minute. At the end of this time, the cup is removed, and the skin test area, indicated by numeral 30A in FIGURE 2, is examined with the 2½×loupe. The petechiae are counted. If the result is normal, the test is finished. If abnormal, the procedure is repeated on other areas at successive vacuums of 20 and 10 centimeters, after each of which runs the count, as described above, is made, and the results noted. The number of petechiae counted under chosen standard conditions serves as an index of capillary fragility which may be called the P-Reading or P. The capillary fragility indicates the integrity of the cardio-vascular system, and is an important factor. As used herein, the general region tested is called the site, and the skin directly under the cup is called the area.

Repeated tests on over 900 individuals have resulted in determining known relationships between the P-Reading and cardio-vascular integrity.

At 30 cm. mercury vacuum:

0–7 P _____ Normal.
7–15 P _____ Mildly positive (abnormal).
15–35 _____ Moderately positive (abnormal).
35+ _____ Strongly positive (abnormal).

As explained above, if the 30 cm. run result is not normal, additional runs at .20 cm. and then 10 cm. should preferably be made to complete the test and give confirmatory and refined results. A guide to the interpretation of the P-Readings at different suctions is as follows:

| Vacuum | Petechiae | |
|---|---|---|
| | Normal | Abnormal |
| 30 cm. Hg | 0-7 P | 45 P |
| 20 | 0-1 | 25 |
| 10 | 0-0 | 10 |

For the purposes of determining whether a patient is in satisfactory condition for certain types of delicate surgery, the information as obtained above is sufficient to decide whether or not further treatment to reduce the capillary fragility index is needed before undertaking the surgery. This is one of many tests needed before surgery.

It is understood that the exact quantitative limits recited above can be varied while still adhering to the principles of the invention, but a great many experiments have been made to amass data in accord with the recited limits to produce useful guides. It is apparent that other vacuum levels, other cup areas, other loupe powers and other time periods could be chosen, resulting in different sets of significant figures. The present significant figures are however now considered as standardized and have been found to be very useful.

The discovery that the results of this test have a significant relationship to the cardio-vascular integrity of the individual is an important aspect of this invention.

The physical structure of the apparatus can vary within the scope of this invention. For example, different means for regulating the amount of vacuum, as by varying the motor speed, may be utilized.

To provide a complete picture of the patient or other individual's blood and cardio-vascular condition, this capillary fragility test is used in conjunction with a blood pressure test, and tests of the blood itself.

It has been found that factors involved in a high P-Reading are high intra-capillary pressure, degenerative changes of the endothebal wall, and hereditary and familial tendency to weak capillary intima. The reading is increased by fever, debility, toxic drugs, antibiotics, early senility, diabetes, hypertension, violent sports, steroids, and perhaps other factors.

This test has usefulness in connection with the following, for example: Elective surgery (withhold surgery until P-Reading is normal); to determine progress of treatment in cardio-vascular disease; rheumatic fever; rheumatoid arthritis; limited assistance in diabetic vascular disease; hypertension; participation in violent sports (participant should have normal readings before permitted to take part); to determine beneficial or adverse effect of new or old drugs on capillary tree; in all hemorrhages of undetermined origin; retinal hemorrhages; necessity of good capillary bed when anticoagulants are used; habitual abortion; vascular purpura.

The scope of this invention is to be determined by the appended claims.

I claim:
1. Apparatus for testing capillary fragility comprising a base, an electric motor on said base, a constantly, rotatable vacuum pump providing a continual steady vacuum when said pump is running, said pump being mounted on said base and connected to said motor, a switch to control said motor, a suction side on said pump, a T on and opening into said suction side, said T having connected thereto (a), a vacuum gauge to directly read the degree of vacuum in said suction side, (b) a bleeder line equipped with an adjustable bleeder valve to selectively admit different flows of air from the atmosphere to said suction side to control the degree of vacuum, and (c) an operating line connected to a flexible tube, said flexible tube being connected to and opening into a vacuum cup, said vacuum cup having an open face adapted to be placed against a hairless area of skin of a patient in a sealing relationship.

2. An apparatus as set forth in claim 1 wherein the vacuum in said suction side and thus in said cup is selectively adjustable between the degrees of 10 and 30 centimeters of mercury by adjustment of said bleeder valve, and said cup has an open face with an area equivalent to that of a circle of 20 millimeters diameter, said selected degree of vacuum being constantly and steadily applied and maintained when said open face of said vacuum cup is in said sealing relationship.

References Cited by the Examiner

UNITED STATES PATENTS

| | | | |
|---|---|---|---|
| 2,176,139 | 9/1939 | Lofgren. | |
| 2,591,443 | 4/1952 | Larson et al. | 128—2 |
| 2,927,577 | 3/1960 | Nicolaie | 128—67 |

RICHARD A. GAUDET, *Primary Examiner.*

SIMON BRODER, *Examiner.*